(12) United States Patent
Bauer (10) Patent No.: US 7,036,089 B2
(45) Date of Patent: Apr. 25, 2006

(54) DISTRIBUTION OF APPLICATION WINDOWS IN A COMPUTING DEVICE DISPLAY

(75) Inventor: Jason M Bauer, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 582 days.

(21) Appl. No.: 10/128,673

(22) Filed: Apr. 23, 2002

(65) Prior Publication Data

US 2003/0197739 A1 Oct. 23, 2003

(51) Int. Cl.
*G06F 3/00* (2006.01)

(52) U.S. Cl. ........................ 715/827; 715/789
(58) Field of Classification Search ............... 715/781, 715/789, 790, 792, 794, 802, 807, 798, 799, 715/800, 801, 804, 806, 911, 827
See application file for complete search history.

(56) References Cited

U.S. PATENT DOCUMENTS

| 5,497,454 | A | * | 3/1996 | Bates et al. ............... 715/799 |
| 5,621,904 | A | * | 4/1997 | Elliott et al. ............... 715/798 |
| 5,712,995 | A | * | 1/1998 | Cohn ......................... 715/792 |
| 5,825,360 | A | * | 10/1998 | Odam et al. ............... 715/807 |
| 5,874,962 | A | * | 2/1999 | de Judicibus et al. ...... 715/789 |
| 5,880,725 | A | * | 3/1999 | Southgate .................. 715/790 |
| 5,920,315 | A | * | 7/1999 | Santos-Gomez ........... 715/792 |
| 6,008,809 | A | * | 12/1999 | Brooks ....................... 715/792 |
| 6,043,817 | A | * | 3/2000 | Bolnick et al. ............ 715/788 |
| 6,462,759 | B1 | * | 10/2002 | Kurtzberg et al. ......... 715/803 |
| 6,707,476 | B1 | * | 3/2004 | Hochstedler ............... 715/789 |
| 6,724,403 | B1 | * | 4/2004 | Santoro et al. ............ 715/765 |

OTHER PUBLICATIONS

Screen Dumps of Microsoft Excel 2000 (pp. 1-6, 1999).*

* cited by examiner

*Primary Examiner*—Kristine Kincaid
*Assistant Examiner*—Lê Nguyen (57) ABSTRACT

A method for distributing windows in a computing device desktop, comprises opening at least one window in the computing device desktop. The method continues with distributing the at least one window in response to a control input such that at least one window is resized and located to fit the desktop such that the icons in the at least one distributed window can be viewed by a user of the computing device.

17 Claims, 6 Drawing Sheets

DISTRIBUTION OF APPLICATION WINDOWS IN A COMPUTING DEVICE DISPLAY

BACKGROUND OF THE INVENTION

The invention relates generally to computing devices and, more particularly, to graphical user interfaces that run on computing devices.

Computing devices, such as desktop computers, laptops, and handheld computers, personal digital assistants, palm computers, and telephone handsets that incorporate a display, have become progressively easier to use especially due to the wide availability of operating systems that employ graphical user interfaces. These graphical user interfaces make use of metaphorical desktops and file folders that make computing devices increasingly more intuitive to manipulate. By way of the graphical user interface, a user can open files and/or programs as application windows that enable a drag and drop operation for copying or moving an icon from one application to another.

In a graphical user interface, the term "drag" refers to moving an icon on a display screen. The icon may represent a computing device file, computing device program, or any other desktop object or image. To drag an icon across a display screen, the user typically selects the icon with a mouse button and moves the mouse while keeping the mouse button depressed. The term "drag" is also used more generally to refer to any operation in which the mouse button is held down while the mouse is moved. For example, a user might drag the mouse to select a block of text.

Both the WINDOWS™ and MACINTOSH™ operating systems permit numerous application windows to be displayed on the computing device desktop at the same time. As used herein, the term "application window" (hereinafter referred to simply as a "window") is considered to be a division of a computing device display screen that typically encompasses a rectangular area. In a graphical user interface, windows can be opened, closed, and moved within the screen area. The user can control the size and shape of the windows. Windows can be overlapped, and overlapping windows can be brought to the front (meaning that their entire contents can be viewed by the user) or sent to the back (meaning that one or more windows can obscure a portion of the window from the user).

On occasion, a user may simultaneously display several application windows on a computing device display, thus requiring the user to manipulate the windows so as to be able to view the entire contents of the display. If the user has a large number of files or applications open at one time, it can be difficult to select the windows between which an icon is to be dragged. The user may have to resize and relocate multiple windows in order to accomplish this task.

In addition to the above-identified Figures, an exemplary script file has been included in Appendix A to illustrate the program commands that distribute the last two opened windows using the WINDOWS™ operating system. The execution of the commands of the script file is brought about by the activation of a multimedia key present on many keyboards.

DESCRIPTION OF THE PREFERRED EMBODIMENTS

Embodiments of the invention described herein enable a computing device user to quickly distribute a predetermined quantity of windows within a computing device display. In one embodiment, these windows are automatically resized so that each of the resized windows fits within the desktop display area without overlapping any of the other opened windows. This enables the computing device user to view all of the icons within the window. This also allows all of the icons within a window to be viewed so that icons can be dragged from one window to another.

Figure 1:
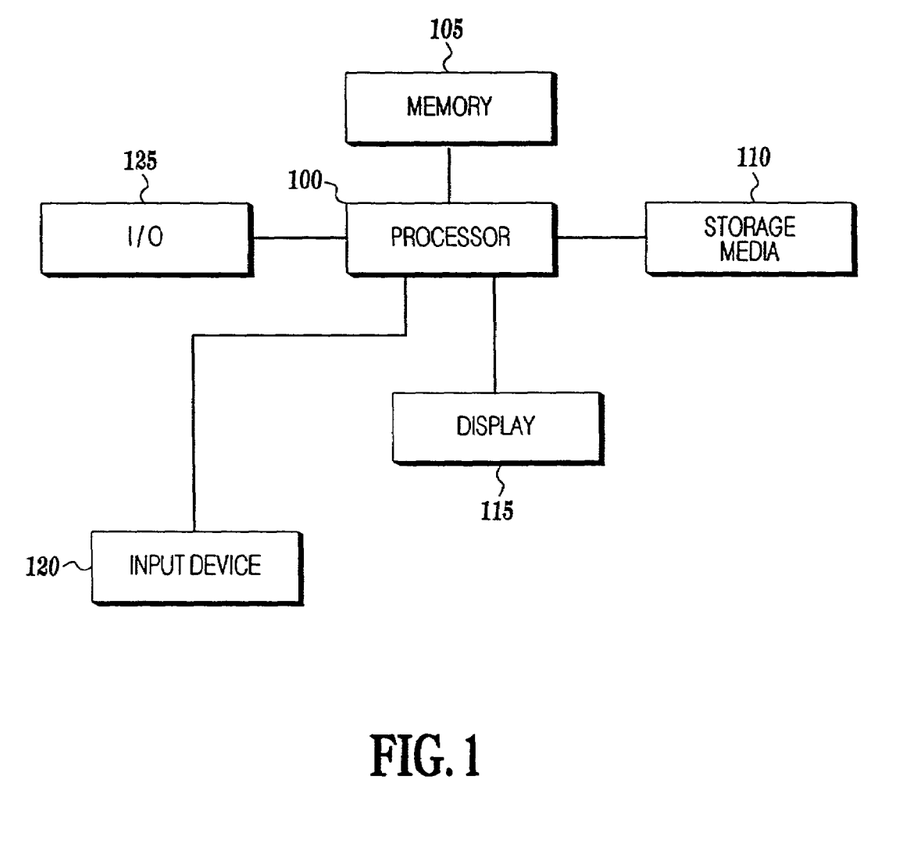
FIG. 1 is a block diagram of a computing device in accordance with one embodiment of the invention.

FIG. 1 is a block diagram of a computing device in accordance with one embodiment of the invention. The computing device includes processor 100 that controls the operation of the computing device as directed by an operating system running on the processor. An example of such a processor is a POWERPC™ or PENTIUM™ processor.

Processor 100 is coupled to memory 105. Memory 105 is used by the processor to store data for display as well as data being processed by processor 100. Memory 105 can include semiconductor memory such as random access memory (RAM), read only memory (ROM), or a variety of other memory technologies.

Storage media 110 is used by processor 100 to store data for longer-term storage than that provided by memory 105. Examples of storage media 110 include floppy disk drives, optical and magnetic disk drives, and other types of non-volatile storage media. Storage media 110 can be removable or resident within the computing device of FIG. 1.

Processor 100 is additionally coupled to display 115 so that information can be displayed to the user of the computing device of FIG. 1. Display 115 may be a liquid crystal display (LCD), a cathode ray tube (CRT), or may make use of any other display technology. In the embodiment of FIG. 1, processor 100 runs an operating system that includes a graphical user interface that allows the user to drag icons between applications and within the desktop.

The user of the computing device of FIG. 1 uses input device 120 to enter data used by processor 100 in generating desired information under the control of the operating system and/or an application program. Input device 120 may be a standard QWERTY-style keyboard with a mouse or trackball, or any other device that supplies inputs to the graphical user interface portion of the operating system running on the computer of FIG. 1.

The computing device of FIG. 1 also includes input/output ports 125 to communicate data outside of the computing device. Input/output ports 125 can include Universal Serial Bus ports, FIREWIRE ports, serial and parallel ports, or any other type of input/output port.

The computing device of FIG. 1, which includes processor 100 memory 105, input device 120, and an operating system that includes a graphical user interface are but one embodiment of a device that provides windows in which various applications, such as file management, word processing, and electronic mail, can be executed. In one embodiment, two or more of the open windows' locations and sizes are adjusted so that the two or more windows are sized and displayed simultaneously according to a user-defined list of rules. Embodiments of the invention can be practiced on any computing device that executes the instructions required to accomplish the various embodiments.

Figure 2:
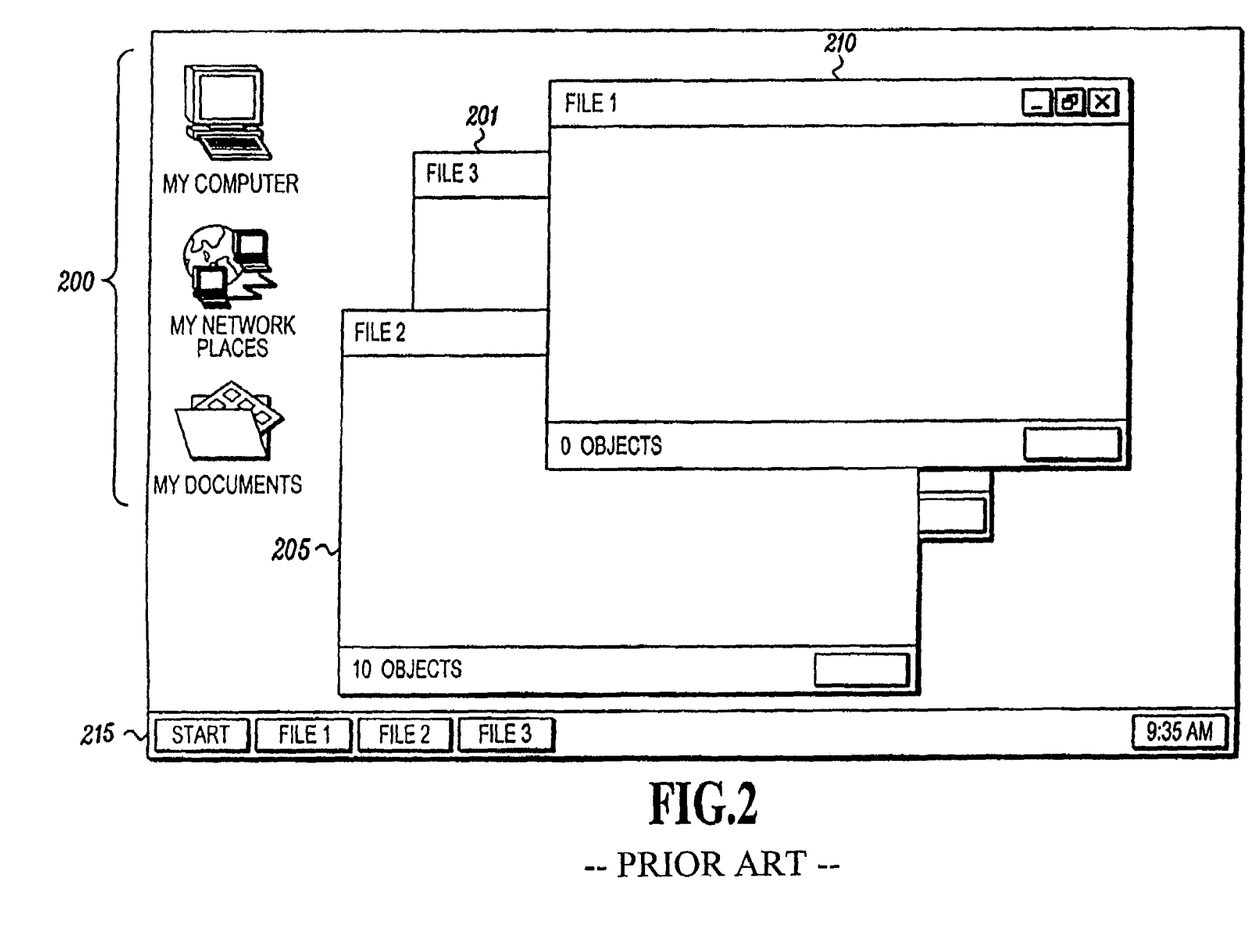
FIG. 2 is an illustration of a computing device desktop in which an embodiment of the invention may be practiced.

FIG. 2 is an illustration of a computing device desktop in which an embodiment of the invention may be practiced. The desktop of FIG. 2 is representative of a desktop used in the WINDOWS™ operating system. It is contemplated that the desktop includes a number of icons (200) that represent computing device files, computing device programs, or other desktop objects or images. Also shown in FIG. 2 is control strip 215, which may be used to access other files and programs that can be executed on the computing device.

If the computing device user has opened a file, the opened file is contemplated as being displayed in a window on the computing device desktop. In the embodiment of FIG. 2, the computing device user has opened files corresponding to windows 201, 205, and 210 in a consecutive manner. As the file corresponding to window 201 has been opened prior to the files corresponding to windows 205 and 210, window 201 appears on the computing device monitor as being on the bottom of or "below" open windows 205 and 210. Since the file corresponding to window 205 was opened second, this window is located on top of window 201 but below window 210. Finally, the file corresponding to window 210 was opened last and is therefore on top of windows 205 and 201. As illustrated in FIG. 2, in the event that the user wishes to move files from an obscured portion of window 201 to window 210, the user must first uncover the file from the obscured portion of window 201.

Figure 3:
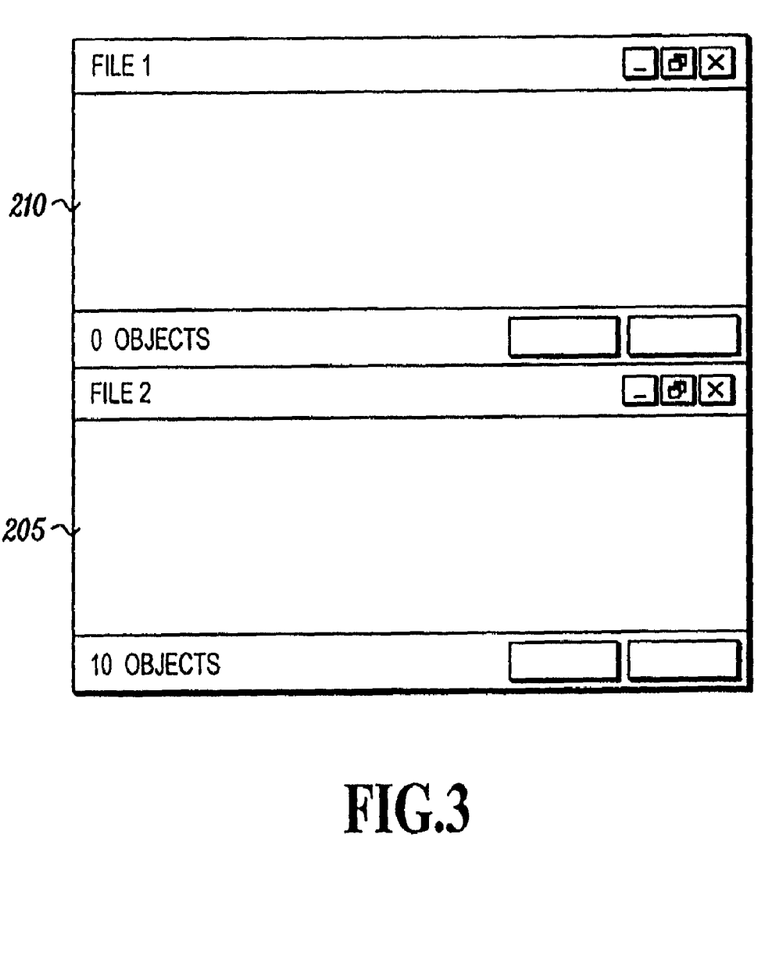
FIG. 3 is an illustration of a computing device desktop after operation of an embodiment of the invention.

FIG. 3 is an illustration of a computing device desktop after operation of an embodiment of the invention. In this embodiment, the last two windows opened (windows 205 and 210) are expanded and distributed horizontally so that the two windows are resized to occupy substantially the same size of the desktop. In the example of FIG. 3, it can be seen that the combination of windows 205 and 210 substantially fills the entire computing desktop. The computing device user may now readily vertically drag and drop icons between windows 205 and 210 as no portion of the opened windows is obscured from the user's view.

In an example that accords with the embodiment of FIG. 3, the user of the computing device may wish to display a first window that shows the "Inbox" of an electronic mail program as well as displaying a second window that shows a word processing document currently being viewed by the user. In this example, the user has specified to the operating system that the last two windows opened (i.e. the Inbox of the electronic mail program and the word processing program) are to be distributed in a side-by-side manner, as shown in FIG. 4.

In this example, a configuration file accessible to the operating system (such as the script file listed in Appendix A herein) can be used to inform the operating system of the user-defined rules of the distribution of the two windows. These rules can include whether the windows are to be distributed vertically, horizontally, or according to another arrangement. These rules can also include the distribution of the windows in connection with another window, such as placing the word processing application window to the left of the Inbox of the electronic mail program. These rules can also include whether each window occupies an equal amount of screen area or whether a first window is to occupy more screen area than a second window. Further, these rules can include how the distribution of the windows is invoked, such as by way of assigning a function key (such as F1 through F12 on a standard keyboard, or a "multimedia" button used to activate particular computer programs such as mail, web browsing, and so forth) to bring about the distribution of the windows.

Figure 4:
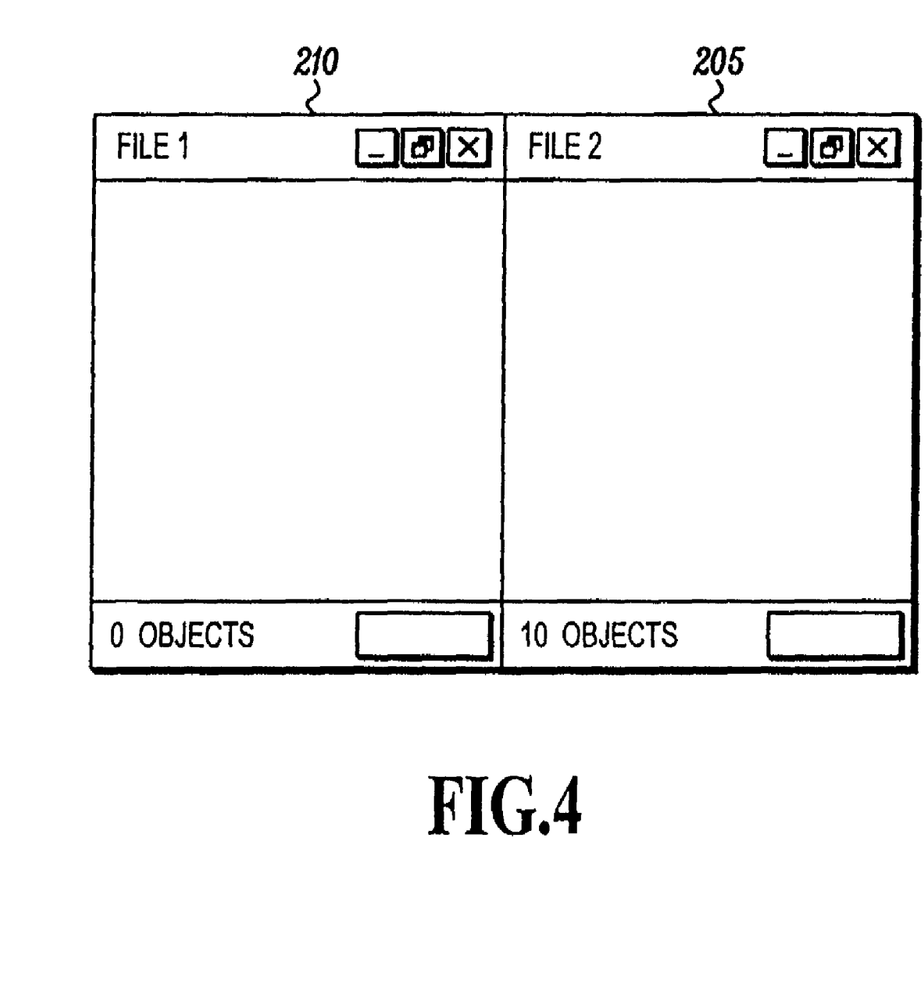
FIG. 4 is an illustration of a computing device desktop after operation of another embodiment of the invention.

FIG. 4 is an illustration of a computing device desktop after operation of another embodiment of the invention. In the embodiment of FIG. 4, windows 205 and 210 are distributed vertically and resized to be of substantially equal size. In other embodiments, however, these windows may be of unequal size, as the computing device user may wish to emphasize the operations being performed in the larger window while occasionally only monitoring the operations performed in the smaller window. In FIG. 4, the combined area of windows 205 and 210 substantially fills the computing device desktop. The computing device user may now horizontally drag and drop icons between windows 205 and 210. Further, no portions of either window are obscured from the user's view.

The invention is not limited to performing the distribution operation on only the last two opened windows. Another embodiment of the invention, such as the embodiment of FIG. 5, distributes another number of windows (such as 1, 3, 4, or more) according to a user-defined set of rules in a preferences or configuration data file accessed by the computing device. The distribution may be accomplished horizontally (i.e. one atop the other), vertically (i.e. side by side), in the corners of the display area, or according to another arrangement. In the case of a single window, the single windows may be resized so as to substantially fill the entire desktop of the computing device.

While the embodiments illustrated in FIGS. 3 and 4 show the windows expanding to fill the entire desktop, alternate embodiments of the invention may bring about the expansion of the windows by an amount just sufficient to eliminate overlapping a first window onto a second. Such an embodiment may therefore leave underlying portions of the desktop visible to the user, thus allowing access to the underlying desktop as well as to the distributed windows.

It is contemplated that any number or combination of user inputs can be used to bring about the distribution of windows on the display of a given computing device according the key assignments made in a configuration or preferences file. Thus, for example, activation of the F1 key can be used to invoke the vertical distribution of a word processing program and an Inbox of an electronic mail program, each covering 50 percent of the display area, with the word processing window being located to the right of the Inbox. An exemplary second configuration, invoked by activation of the F2 key, can be used to bring about the display of a word processing program, Inbox, and an Internet browser covering 40 percent, 40 percent, and 20 percent of the screen area, respectively. Other inputs, such as other function keys, combinations of keys, multimedia keys that activate particular computer programs, or inputs from a mouse or trackpad can also be used to bring about the distribution of windows on the display of a given computing device.

Figure 5:
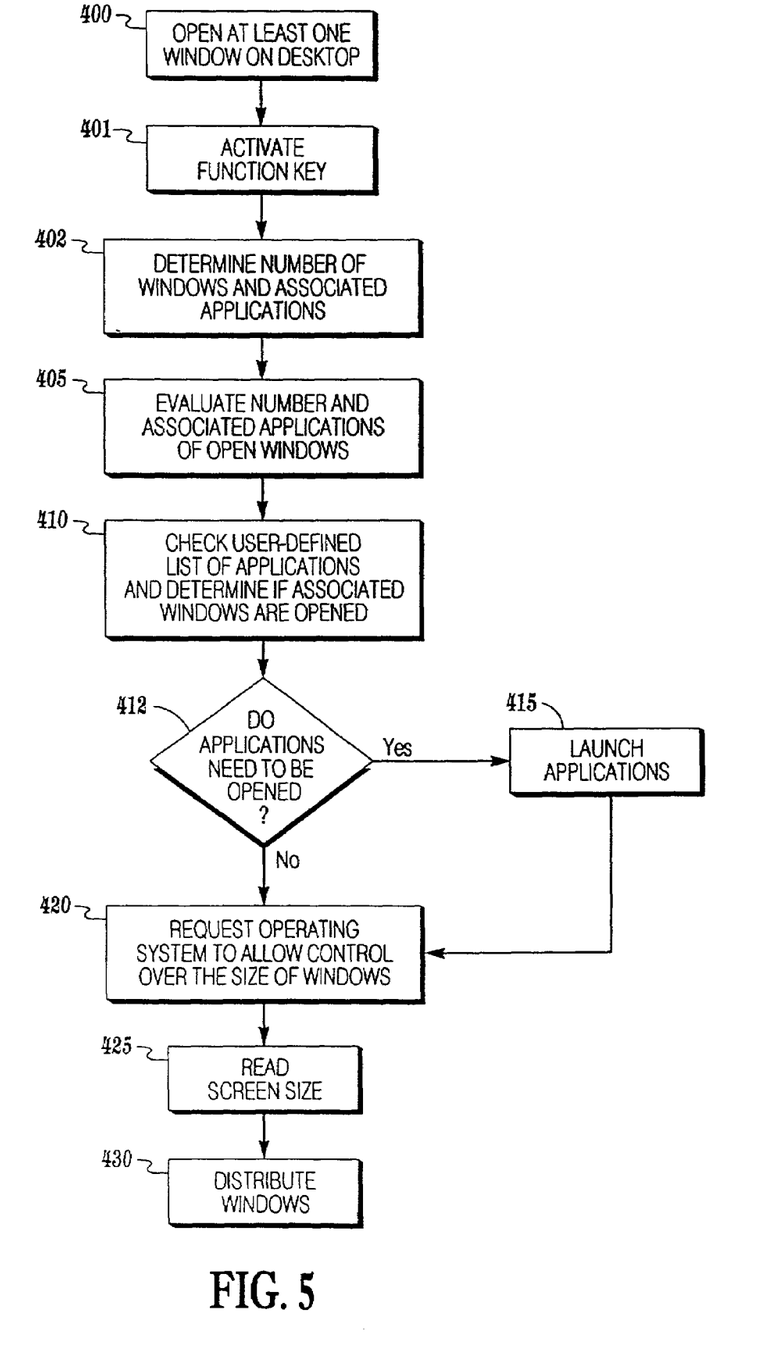
FIG. 5 is a flowchart of a method for distribution of application windows in a computing device desktop in accordance with an embodiment of the invention.

FIG. 5 is a flowchart of a method for distribution of application windows in a computing device desktop in accordance with an embodiment of the invention. The computing device of FIG. 1 is suitable for executing the method of FIG. 5. The method begins at step 400, in which the user of the computing device opens at least one window on the computing device desktop. At step 401, the user activates a function key. At step 402, in response to the activation of the function key, the operating system is queried to determine the number of windows open on the display as well as the programs associated with each of the opened windows. These programs may include processing applications, electronic mail programs, Internet browsers, and so forth. The method continues at step 405 in which the number and the associated applications of the open windows returned by the operating system is evaluated.

At step 410 a user-defined list of applications is evaluated to determine if all of the applications on the user-defined list are currently opened. The user-defined list evaluated in step 410 can be located in a configuration or preferences file accessible to the operating system. The user-defined list evaluated in step 410 may include as few as one application or may include as many as five or more applications. At step 412, a decision is made as to whether there are applications that need to be opened, thus allowing for the possibility that the user-defined list includes application programs that are not currently open on the desktop. If all of the applications on the user-defined list are opened, the method continues at step 420. If there are applications on the user-defined list that are not currently opened, these applications are launched, in step 415.

At step 420, the operating system is requested to allow control over the size of a number of the windows. At step 425, the screen size of the display is read. At step 430, the windows corresponding to each of the user-defined applications are distributed according to user-defined rules stored in the configuration file, such as the horizontal distribution of FIG. 3 or the vertical distribution of FIGS. 4.

In some applications, all of the steps of FIG. 5 may not be necessary. For example, an embodiment of the invention may include only the steps of opening at least one window on the computing device desktop (as in step 400) and distributing the at least one window in response to an input (such as the keyboard input of step 401). The input of step 401 causing the computing device to distribute the at least one window such that the at least one window is resized and located to occupy the desktop wherein the area in the at least one distributed window can be viewed by the user of the computing device.

Figure 6:
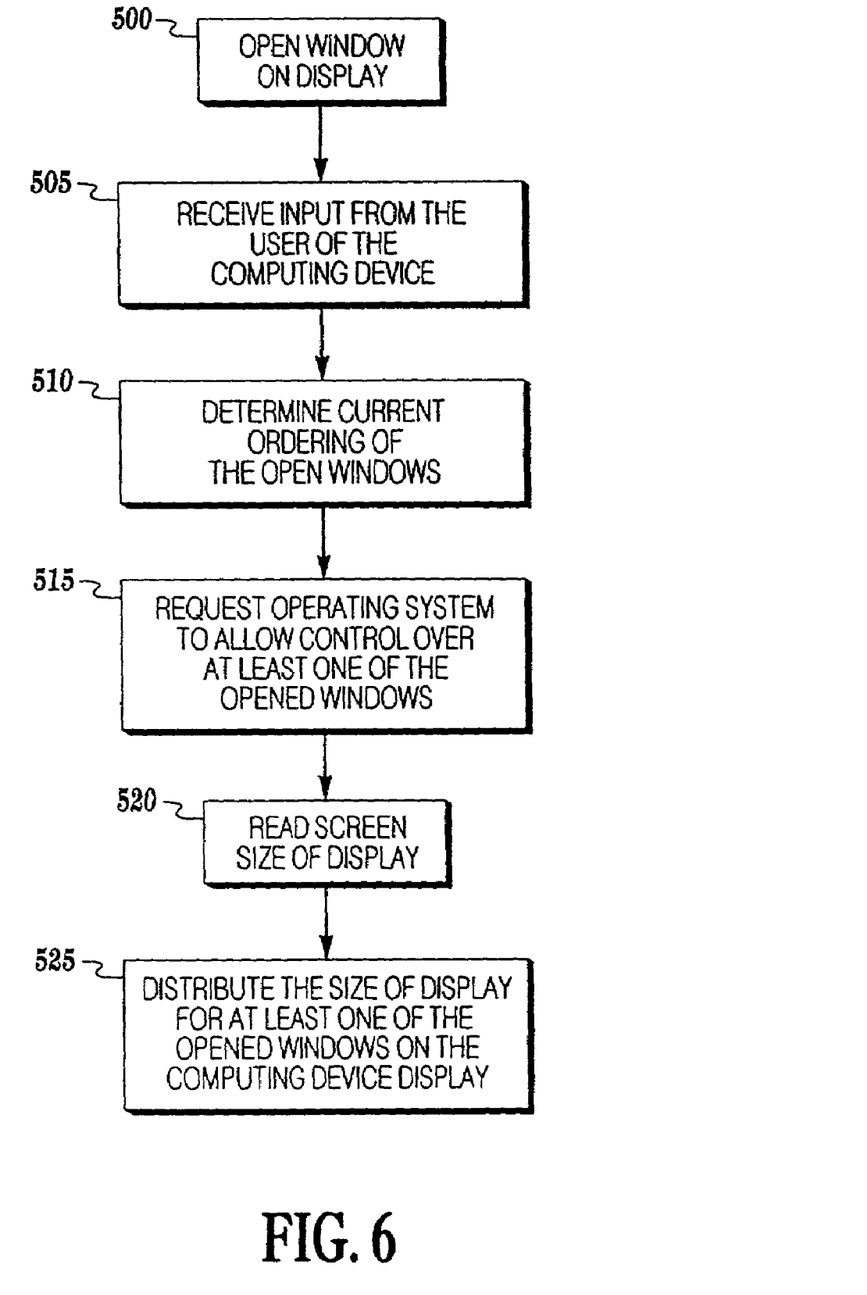
FIG. 6 is a flowchart of a method for distribution of application windows in a computing device desktop in accordance with another embodiment of the invention.

FIG. 6 is a flowchart of a method for distributing application windows in a computing device desktop in accordance with another embodiment of the invention. The computing device of FIG. 1 is suitable for executing the method of FIG. 6. The method of FIG. 6 may be performed by a computing device program in the absence of a user-defined list of applications corresponding to windows being displayed on the desktop of the computing device.

At step 500, the method of FIG. 6 begins by accepting inputs from the user to open at least one window on the computing device desktop. The at least one window can correspond to any application program that can be run on the computing device. At step 505, the computing device receives an input to distribute the window(s) on the desktop. At step 510, the current order of open windows is determined using any suitable ordering scheme. In one embodiment, the most recently opened window(s), which desirably appears in front of any previously opened windows, is assigned a "Z" order of zero (or Z=0). The next most recently opened window, appearing immediately behind the Z=0 window, is assigned to Z=1. Previously opened windows are assigned successively increasing values of Z, however, only one window (such as the Z=0 window) need be opened in order to for the method of FIG. 6 to be invoked.

At step 515, the operating system is requested to allow control over the size of the last-one or more opened application windows (Z=0, Z=1, Z=2, and so forth). At step 520, the screen size of the display is read. At step 525, the last one or more opened application windows are distributed either horizontally or vertically such that each window occupies a portion of the display area. Step 525 may include reading a configuration file to determine the area occupied by the distributed windows. Additionally, nothing prevents dividing the screen according to the number of applications present in the configuration file. Thus, three applications listed in the configuration file may result in the automatic distribution of the windows in which each window occupies one-third of the screen area.

The embodiments of FIGS. 5 and 6 can be stored as a computing device-readable code data file comprising a set of instructions in the memory of the computing device of FIG. 1. In these embodiments, the data file could take the form of a macro program and be executed from memory 105. In other embodiments, the computing device-readable code data file may be stored on and executed from storage media 110. In an exemplary embodiment A computing device-readable medium having computer readable instructions causes the computing device to execute the steps of opening windows on a desktop of the computing device display (as in step 500), receiving an input to distribute the opened windows (as in step 510) on the desktop of the computing device display, requesting an operating system that runs on the computing device to allow control over the opened windows (as in step 515), and distributing the opened windows within the computing device display (as in step 525).

In some applications, all of the steps of FIG. 5 may not be necessary. For example, an embodiment of the invention may include only the steps of opening a window on the desktop of the computing device display (as in step 500), requesting an operating system to allow control the opened window (as in step 515) distributing the opened window within the computing device display (as in step 525).

The methods of FIGS. 5 and 6 may be accessed and executed so as to automatically adjust window sizes as described herein by the computing device user depressing a select key on the keyboard as a control input, such as by way of function keys (F1–F12), or multimedia keys. However, nothing prevents the keyboard input being the depression of a series or combination of control key inputs such as either the sequential or simultaneous depression of the "ctrl", "alt", and "pgdn" keys to invoke one of the embodiments of the invention.

Appendix A is an exemplary Visual Basic™ script file that lists the program commands used to distribute ("tile" as used in the file) the last two opened windows using the WINDOWS™ operating system. The execution of the commands of the script file is brought about by the activation of a multimedia key present on many keyboards. However, the program can be modified to distribute a lesser or a greater number of opened windows. Additionally, the execution of the script file can be brought about by the activation of another multimedia key, function key, or by way of any other keyboard input. The script file of Appendix A follows the general logic of FIG. 6.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

APPENDIX A

```
Attribute VB_Name = "modDeclares"
Option Explicit
Public Type RECT
   Left As Long
   Top As Long
   Right As Long
   Bottom As Long
End Type
Public Type POINTAPI
   x     As Long
   y     As Long
End Type
Public Type WINDOWPLACEMENT
   Length         As Long
   flags          As Long
   showCmd        As Long
   ptMinPosition  As POINTAPI
   ptMaxPosition  As POINTAPI
   rcNormalPosition As RECT
End Type
Public Const SW_SHOWNORMAL = 1
Public Const SW_SHOWMINIMIZED = 2
Public Const SW_SHOWMAXIMIZED = 3
Public Const SW_SHOWNOACTIVATE = 4
Public Const SW_SHOW = 5
Public Const WPF_RESTORETOMAXIMIZED = &H2
Public Const GW_HWNDFIRST = 0
Public Const GW_HWNDNEXT = 2
Public Const GW_OWNER = 4
Public Const HWND_TOP = 0
Public Const SWP_SHOWWINDOW = &H40
Public Declare Function EnumWindows Lib "user32" _
   (ByVal IpEnumFunc As Long, _
    ByVal IParam As Long) As Long
Public Declare Function GetWindowText Lib "user32" _
   Alias "GetWindowTextA" _
   (ByVal hWnd As Long, _
    ByVal IpString As String, _
    ByVal cch As Long) As Long
Public Declare Function GetClassName Lib "user32" _
   Alias "GetClassNameA" _
   (ByVal hWnd As Long, _
    ByVal IpClassName As String, _
    ByVal nMaxCount As Long) As Long
Public Declare Function GetWindowTextLength Lib "user32" _
   Alias "GetWindowTextLengthA" (ByVal hWnd As Long) As Long
Public Declare Function IsWindowVisible Lib "user32" _
   (ByVal hWnd As Long) As Long
Public Declare Function GetParent Lib "user32" _
   (ByVal hWnd As Long) As Long
Public Declare Function IsWindowEnabled Lib "user32" _
   (ByVal hWnd As Long) As Long
Public Declare Function IsZoomed Lib "user32" _
   (ByVal hWnd As Long) As Long
Public Declare Function GetWindowPlacement Lib "user32" _
   (ByVal hWnd As Long, _
    Ipwndpl As WINDOWPLACEMENT) As Long
Public Declare Function SetWindowPlacement Lib "user32" _
   (ByVal hWnd As Long, _
    Ipwndpl As WINDOWPLACEMENT) As Long
Public Declare Function BringWindowToTop Lib "user32" _
   (ByVal hWnd As Long) As Long
Public Declare Function SetForegroundWindow Lib "user32" _
   (ByVal hWnd As Long) As Long
Public Declare Function GetForegroundWindow Lib "user32" ( ) As Long
Public Declare Function GetWindow Lib "user32"
(ByVal hWnd As Long, ByVal wCmd As Long) As Long
Public Declare Function SetWindowPos Lib "user32" (ByVal
```

APPENDIX A-continued

```
hWnd As Long, ByVal hWndInsertAfter As Long, ByVal x As Long,
ByVal y As Long, ByVal cx As Long, ByVal cy As Long, ByVal wFlags
As Long) As Long
Public Declare Function GetTopWindow Lib "user32" (ByVal
hWnd As Long) As Long
Public Declare Function GetDesktopWindow Lib "user32" ( ) As Long
' ********** screen coords ****************
Public Const SPI_GETWORKAREA& = 48
Public Declare Function SystemParametersInfo Lib "user32" _
   Alias "SystemParametersInfoA" _
   (ByVal uAction As Long, _
    ByVal uParam As Long, _
    IpvParam As Any, _
      ByVal fuWinIni As Long) As Long
Attribute VB_Name = "modMain"
Option Explicit
Private bInUseCmdLine As Boolean
Private bInShowHelp As Boolean
Private bInVertical As Boolean
Private hWndTop As Long
Private hWndDeskTop As Long
Private hWnd0 As Long
Private hWnd1 As Long
Private hWnd2 As Long
Private WindowPos As WINDOWPLACEMENT
Sub Main( )
   Dim strTitle As String
   Dim strOutput As String
   Dim midx As Long
   Dim midy As Long
   Dim WP As WINDOWPLACEMENT
   ParseCmd
   If bInShowHelp Then
      MsgBox "Tile usage:" & vbCrLf & _
         "tile -v    Tile top 2 windows vertically." & vbCrLf & _
         "tile /v    Tile top 2 windows vertically." & vbCrLf & _
         "tile -h    Tile top 2 windows horizontally." & vbCrLf & _
         "tile /h    Tile top 2 windows horizontally." & vbCrLf & _
         vbCrLf & "Alternatively, you can rename tile.exe to either
vtile.exe or htile.exe:" & vbCrLf & _
         "vtile      Tile top 2 windows vertically." & vbCrLf & _
         "htile      Tile top 2 windows horizontally." & vbCrLf & _
         vbCrLf & "tile /?    This window." & vbCrLf & _
         vbCrLf & "(c)2001 Jason Bauer jason_bauer@hp.com",
vbOKOnly, "Tile/VTile/HTile Help"
   Else
      ' get topmost window
      hWndTop = GetTopWindow(0)
      GetWindowPlacement hWndTop, WindowPos
      strTitle = GetWindowTitle(hWndTop)
      'now find topmost user parent window
      While IsNotAGoodWindow(hWndTop)
         hWndTop = GetWindow(hWndTop, GW_HWNDNEXT)
         GetWindowPlacement hWndTop, WindowPos
         strTitle = GetWindowTitle(hWndTop)
      Wend
      ' find next window down
      hWnd1 = GetWindow(hWndTop, GW_HWNDNEXT)
      GetWindowPlacement hWnd1, WindowPos
      strTitle = GetWindowTitle(hWnd1)
      ' now find next user parent window
      While IsNotAGoodWindow(hWnd1)
         hWnd1 = GetWindow(hWnd1, GW_HWNDNEXT)
         GetWindowPlacement hWnd1, WindowPos
         strTitle = GetWindowTitle(hWnd1)
      Wend
      ' get screen coords
      Dim rc As RECT
      Dim r As Long
      r = SystemParametersInfo(SPI_GETWORKAREA, 0&, rc, 0&)
      ' now, determine whether to tile v or h
      If Not bInUseCmdLine Then
         If LCase(App.EXEName) = "htile" Then
            bInVertical = False
         ElseIf LCase(App.EXEName) = "vtile" Then
            bInVertical = True
         End If
      End If
      'if is minimized, then restore it
```

APPENDIX A-continued

```
With WP
    .Length = Len(WP)
    .flags = 0&
    .showCmd = SW_SHOWNORMAL
End With
SetWindowPlacement hWndTop, WP
SetWindowPlacement hWnd1, WP
If bInVertical Then
    midx = rc.Right/2
    midy = rc.Bottom
    SetWindowPos hWndTop, HWND_TOP, rc.Left, rc.Top,
        midx, midy,
SWP_SHOWWINDOW
    SetWindowPos hWnd1, HWND_TOP midx, rc.Top, midx, midy,
SWP_SHOWWINDOW
Else
    midx = rc.Right
    midy = rc.Bottom/2
    SetWindowPos hWndTop, HWND_TOP, rc.Left, rc.Top,
        midx, midy,
SWP_SHOWWINDOW
    SetWindowPos hWnd1, HWND_TOP, rc.Left, midy, midx, midy,
SWP_SHOWWINDOW
End If
    strOutput = "hWndTop:" & hWndTop & vbCrLf & _
    "title:" & GetWindowTitle(hWndTop) & vbCrLf
    strOutput = strOutput & "hWnd1:" & hWnd1 & vbCrLf & _
    "title:" & GetWindowTitle(hWnd1)
    On Error Resume Next
    Dim f As Long
    f = FreeFile
    Open "c:\tile.log" For Append As #f
    Print #f, Now
    Print #f, strOutput
    Print #f, "Done."
    Close #f
End If
'MsgBox strOutput
End Sub
Private Function GetWindowTitle(hWnd As Long) As String
    Dim sTitle As String
    Dim nSize As Long
    sTitle = Space$(255)
    nSize = GetWindowText(hWnd, sTitle, 255)
    GetWindowTitle = Left(sTitle, nSize)
End Function
Private Function IsNotAGoodWindow(hWnd As Long) As Boolean
    IsNotAGoodWindow = IsWindowVisible(hWnd) = False _
    Or GetParent(hWnd) < > 0& _
    Or GetWindowTitle(hWnd) = " " _
    Or GetWindowTitle(hWnd) = "tile" _
    Or InStr(1, GetWindowTitle(hWnd), "Microsoft Visual Basic") > 0
End Function
Private Sub ParseCmd( )
    Dim Cmds As Variant
    Cmds = Split(Command$)
    bInShowHelp = False
    bInUseCmdLine = False
    bInVertical = False
    If UBound(Cmds) > -1 Then
        If Cmds(0) = "-v" Or _
        Cmds(0) = "/v" Or _
        Cmds(0) = "-V" Or _
        Cmds(0) = "/V" Then
            bInVertical = True
            bInUseCmdLine = True
        ElseIf Cmds(0) = "-h" Or _
        Cmds(0) = "/h" Or _
        Cmds(0) = "-H" Or _
        Cmds(0) = "/H" Then
            bInVertical = False
            bInUseCmdLine = True
        ElseIf Cmds(0) = "-?" Or _
        Cmds(0) = "/?" Then
            bInShowHelp = True
        End If
    End If
End Sub
```

What is claimed is:

1. A method for distributing windows on a computing device desktop, comprising the steps of:
opening at least two windows;
distributing the at least two opened windows in response to a keyboard input such that the at least two opened windows are resized and located to occupy the desktop such that the area in the at least two opened windows can be viewed by the user of the computing device, wherein a first window of the at least two opened windows expands vertically and relocates to a left side portion of the computing device desktop and wherein a second window of the at least two opened windows expands vertically and relocates to a right side portion of the computing device desktop; and
activating a plurality of user-defined layout distributions, locations, and coverage configurations with a plurality of input mechanisms, wherein each input mechanism activates a different layout distribution, location and coverage configuration.

2. The method of claim 1 wherein a first window of the at least two opened windows occupies a greater area than a second window of the at least two opened windows.

3. An apparatus for distributing windows on a display of a computing device, comprising:
means for opening a plurality of windows on the display;
means for receiving an input from a user, the means for receiving the input being coupled to the means for opening; and
means for distributing the plurality of opened windows in response to the received input such that at least two of the plurality of opened windows are distributed such that any icons located in each distributed window are visible on the display, wherein a first window of the plurality of opened windows expands vertically and relocates to a left side portion of the computing device desktop and wherein a second window of the plurality of opened windows expands vertically and relocates to a right side portion of the computing device desktop; and
means for activating a plurality of user-defined layout distributions, locations, and coverage configurations with a plurality of input mechanisms, wherein each input mechanism activates a different layout distribution, location, and coverage configuration.

4. The apparatus of claim 3, wherein the at least two of the plurality of opened windows correspond to applications in a user-defined list.

5. The apparatus of claim 3, wherein the at least two of the plurality of opened windows comprises the last two windows opened by the user of the computing device.

6. The apparatus of claim 5, wherein the means for distributing expands a first window of the last two opened windows horizontally and relocates the first window to a top portion of the computing device display, the means for distributing additionally expanding a second window of the last two opened windows horizontally and relocating the second window to a bottom portion of the computing device display.

7. The apparatus of claim 3, wherein the means for distributing expands a first window of the last two opened windows vertically and relocates the first window to a left side portion of the computing device display, the means for distributing additionally expanding a second window of the last two opened windows vertically and relocating the second window to a right side portion of the computing device display.

8. The apparatus of claim 3, wherein the means for distributing additionally determines, from a configuration file, the at least two windows to be distributed.

9. A method for distributing windows in a computing device display comprising the steps of:
   opening a plurality of windows on the desktop of the computing device display;
   requesting an operating system to allow control over certain ones of the plurality of the opened windows;
   distributing the certain ones of the plurality of the opened windows within the computing device display, wherein a first window of the plurality of the opened windows expands vertically and relocates to a left side portion of the computing device desktop and wherein a second window of the plurality of opened windows expands vertically and relocates to a right side portion of the computing device desktop; and
   activating a plurality of user-defined layout distribution, location, and coverage configurations with a plurality of input mechanisms, wherein each input mechanism activates a different layout distribution, locations and coverage configuration.

10. The method of claim 9, additionally comprising receiving an input to distribute the certain ones of the plurality of the opened windows within the computing device display, the receiving step being performed prior to the requesting step.

11. The method of claim 9 further comprising determining the current ordering of the opened windows, the determining step being performed prior to the requesting step.

12. The method of claim 9, further comprising the step of reading the screen size of the computing device display.

13. The method of claim 9, wherein the certain ones of the plurality of the opened windows correspond to the last two opened windows and wherein the distributing step includes distributing the last two opened windows within the computing device display.

14. The method of claim 9 wherein each of the certain ones of the plurality of the opened windows distributed on the computing device display occupies a substantially equal area.

15. The method of claim 9, wherein at least one of the certain ones of the plurality of the opened windows distributed within the computing device display occupies an area substantially unequal to at least one other of the certain ones of the plurality of the opened windows distributed within the computing device display.

16. A computing device-readable medium having computer readable instructions thereon for causing the distribution of windows on a computing device display by causing the computing device to execute the steps of:
   opening a plurality of windows on a desktop of the computing device display;
   receiving an input to distribute the plurality of opened windows on the desktop of the computing device display;
   requesting an operating system that runs on the computing device to allow control over the plurality of the opened windows;
   distributing the plurality of the opened windows within the computing device display, wherein a first window of the plurality of the opened windows expands vertically and relocates to a left side portion of the computing device desktop and wherein a second window of the plurality of opened windows expands vertically and relocates to a right side portion of the computing device desktop; and
   activating a plurality of user-defined layout distribution, locations and coverage configurations with a plurality of input mechanisms, wherein each input mechanism activates a different layout distribution, locations, and coverage configuration.

17. A method for distributing windows on a computing device desktop, comprising the steps of:
   opening a plurality of windows on the computing device desktop;
   distributing the plurality of windows in response to an input such that certain ones of the plurality of windows are resized and located to occupy the desktop, wherein the area in the at least one distributed window can be viewed by the user of the computing device, wherein a first window of the certain ones of the opened windows expands vertically and relocates to a left side portion of the computing device desktop and wherein a second window of the certain ones of the opened windows expands vertically and relocates to a right side portion of the computing device desktop; and
   activating a plurality of user-defined layout distribution, locations, and coverage configurations with a plurality of input mechanisms, wherein each input mechanism activates a different layout distribution, locations, and coverage configuration.

* * * * *

UNITED STATES PATENT AND TRADEMARK OFFICE
CERTIFICATE OF CORRECTION

PATENT NO. : 7,036,089 B2  Page 1 of 1
APPLICATION NO. : 10/128673
DATED : April 25, 2006
INVENTOR(S) : Jason M Bauer It is certified that error appears in the above-identified patent and that said Letters Patent is hereby corrected as shown below:

In column 10, line 29, in Claim 3, after "opening;" delete "and".

In column 11, line 29, in Claim 11, insert -- plurality of -- before "opened".

In column 11, line 38, in Claim 14, after "claim 9" insert -- , --.

Signed and Sealed this

Twelfth Day of May, 2009

JOHN DOLL
*Acting Director of the United States Patent and Trademark Office*